United States Patent
Knowles

(10) Patent No.: US 6,446,107 B1
(45) Date of Patent: Sep. 3, 2002

(54) CIRCUITRY FOR PERFORMING OPERATIONS ON BINARY NUMBERS

(75) Inventor: Simon Knowles, Bath (GB)

(73) Assignee: STMicroelectronics Limited, Almondsbury (GB)

(*) Notice: Subject to any disclaimer, the term of this patent is extended or adjusted under 35 U.S.C. 154(b) by 0 days.

(21) Appl. No.: 09/336,603

(22) Filed: Jun. 18, 1999

(30) Foreign Application Priority Data

Jun. 19, 1998 (GB) .............................. 9813328

(51) Int. Cl.$^7$ ................................. G06F 7/50
(52) U.S. Cl. ...................... 708/707; 708/709
(58) Field of Search ................ 708/707, 709, 708/706, 692

(56) References Cited

U.S. PATENT DOCUMENTS

| | | | |
|---|---|---|---|
| 4,763,295 A | 8/1988 | Yamada et al. | 364/786 |
| 4,866,655 A | 9/1989 | Nishiyama et al. | 364/761 |
| 5,122,981 A | 6/1992 | Taniguchi | 364/748 |
| 5,251,164 A | 10/1993 | Dodson et al. | 364/715.01 |
| 5,691,930 A | 11/1997 | Kim | 364/760 |
| 5,751,617 A | 5/1998 | Wong | 364/734 |
| 5,898,602 A * | 4/1999 | Rothman et al. | 708/707 |
| 6,076,098 A * | 6/2000 | Nguyen | 708/706 |
| 6,199,090 B1 * | 3/2001 | Mansingh et al. | 708/707 |

OTHER PUBLICATIONS

Abraham and Gajski, Design of Testable Structures Defined by Simple Loops, *IEEE Transactions on Computers*, C–30(11):875–884, Nov. 1981.

* cited by examiner

*Primary Examiner*—David H. Malzahn
(74) *Attorney, Agent, or Firm*—Lisa K. Jorgenson; E. Russell Tarleton; Seed IP Law Group PLLC

(57) ABSTRACT

Circuitry for adding a first binary number (A) having a plurality of bits ($a_0$, $a_1$, . . . ) to a second binary number (B) having a plurality of bits ($b_0$, $b_1$, . . . ) to produce a third binary number (A+B) having a plurality of bits ($s_0$, $s_1$, . . . ) and/or a fourth binary number (A+B+1) having a plurality of bits ($s_0'$, $s_1'$, . . . ) and corresponding to the addition of the third binary number and one. The circuitry includes a plurality of stages wherein each stage has a first input for receiving a bit ($a_i$) of the first binary number (A), a second input for receiving a bit ($b_i$) of the second binary number (B) having the same binary weight (i) as the bit received at the first input and output means for producing a bit ($s_i$) of the third binary number (A+B) and/or a bit ($s_i'$) of the fourth binary number (A+B+1), wherein said output means comprises exclusive OR means for combining a first signal and a second signal to produce a bit of the third binary number and the first signal and a third signal to produce a bit of the fourth binary number wherein said third signal is equivalent to said second signal if both the bits received at the first and second inputs have a LOW logic value, or for any stage having a lower binary weight, both the bits received at the first and second inputs have a LOW logic value and is otherwise equivalent to a predetermined logic value.

49 Claims, 11 Drawing Sheets

Eq 1 where $S_i = P_i \oplus C_i$
$C_{i+1} = g_i + C_i P_i$,
$C_0 = 0$
$g_i = a_i \cdot b_i$, and
$P_i = a_i \oplus b_i$ Eq 2 where $S_i' = P_i \oplus C_i$
$C_{i+1} = g_i + C_i P_i$,
$C_0 = 1$
$g_i = a_i \cdot b_i$, and
$P_i = a_i \oplus b_i$ Eq 3    $S_i = P_i + C_{i:0}$

*Fig. 9A*

Eq 4    $\begin{pmatrix} \overline{k}_{i:j} \\ C_{i+1:j} \end{pmatrix} = \begin{pmatrix} \overline{k} \\ g \end{pmatrix}_i * \begin{pmatrix} \overline{k} \\ g \end{pmatrix}_j = \begin{pmatrix} \overline{k}_i \cdot \overline{k}_j \\ g_i + k_i \cdot g_j \end{pmatrix}$ where   $i = j + 1$
        $k_i$ is the bit kill for bit i
        $k_j$ is the bit kill for bit j
        $g_i$ is the bit generate for bit i
        $g_j$ is the bit generate for bit j
        . is the logical AND operation
        + is the logical OR operation
        − is the logical negation

*Fig. 9B*

$$\begin{pmatrix} \overline{k}_{1:0} \\ c_{2:0} \end{pmatrix} = \begin{pmatrix} \overline{k} \\ g \end{pmatrix}_1 * \begin{pmatrix} \overline{k} \\ g \end{pmatrix}_0 \qquad \text{Eq 5}$$

$$\begin{pmatrix} \overline{k}_{2:0} \\ c_{3:0} \end{pmatrix} = \begin{pmatrix} \overline{k} \\ g \end{pmatrix}_2 * \begin{pmatrix} \overline{k} \\ g \end{pmatrix}_1 * \begin{pmatrix} \overline{k} \\ g \end{pmatrix}_0 = \begin{pmatrix} \overline{k} \\ g \end{pmatrix}_2 * \begin{pmatrix} \overline{k}_{1:0} \\ c_2 \end{pmatrix}$$

$$\begin{pmatrix} \overline{k}_{3:0} \\ c_{4:0} \end{pmatrix} = \begin{pmatrix} \overline{k}_{3:2} \\ c_{4:2} \end{pmatrix} * \begin{pmatrix} \overline{k}_{1:0} \\ c_{2:0} \end{pmatrix}$$

$$\begin{pmatrix} \overline{k}_{4:0} \\ c_{5:0} \end{pmatrix} = \begin{pmatrix} \overline{k} \\ c \end{pmatrix}_4 * \begin{pmatrix} \overline{k}_{3:0} \\ c_{4:0} \end{pmatrix}$$

$$\begin{pmatrix} \overline{k}_{5:0} \\ c_{6:0} \end{pmatrix} = \begin{pmatrix} \overline{k}_{5:4} \\ c_{6:4} \end{pmatrix} * \begin{pmatrix} \overline{k}_{3:0} \\ c_{4:0} \end{pmatrix}$$

$$\begin{pmatrix} \overline{k}_{6:0} \\ c_{7:0} \end{pmatrix} = \begin{pmatrix} \overline{k}_{6:4} \\ c_{7:4} \end{pmatrix} * \begin{pmatrix} \overline{k}_{3:0} \\ c_{4:0} \end{pmatrix}$$

$$\begin{pmatrix} \overline{k}_{7:0} \\ c_{8:0} \end{pmatrix} = \left[ \begin{pmatrix} \overline{k}_{7:6} \\ c_{8:6} \end{pmatrix} * \begin{pmatrix} \overline{k}_{5:4} \\ c_{6:4} \end{pmatrix} \right] * \begin{pmatrix} \overline{k}_{3:0} \\ c_{9:0} \end{pmatrix}$$

*Fig. 9C*

Eq 6a $\begin{pmatrix} k \\ g \end{pmatrix}_0$

*Fig. 9D*

Eq 6b $\begin{pmatrix} k \\ g \end{pmatrix}_0 * \begin{pmatrix} 1 \\ 1 \end{pmatrix}$

*Fig. 9E*

Eq 6c $\begin{pmatrix} k \\ g \end{pmatrix}_0 * \begin{pmatrix} 1 \\ \text{Inc} \end{pmatrix}$

*Fig. 9F*

CIRCUITRY FOR PERFORMING OPERATIONS ON BINARY NUMBERS

TECHNICAL FIELD

The present invention relates to circuitry for adding a binary number A to a binary number B and/or for summing binary number A, the binary number B and the number 1, and, more particularly, the invention relates to circuitry that simultaneously provides the sum of the binary numbers A and B and the sum of the binary numbers A, B and 1. Other embodiments of the invention include circuitry for selectively summing the binary numbers A and B or the binary numbers A, B, and 1.

BACKGROUND OF THE INVENTION

FIG. 1 illustrates known circuitry for summing the binary number A and the binary number B. The binary number A is represented as a series of bits $a_i$ where i is the binary weight of the bit $a_i$ and increases from the value zero for the least significant bit of A in steps of one to the value of the most significant bit of A. In the examples, A and B are eight bit numbers although only three bits are shown in FIG. 1. The binary number B is a series of bits $b_i$ where i is the binary weight of the bit. The summation of the numbers A and B is represented by the binary number S which is a series of bits $s_i$ where i is the binary weight of the bit. The summation of the numbers A, B, and 1 is the number S' which is a series of bits $s'_i$, where i is the binary weight of the bit. The addition circuitry illustrated in FIG. 1 receives as inputs the number A, the number B, and an initial carry-in value $c_0$. The circuitry produces the number S if the initial carry-in value $c_0$ is zero and the number S' if the initial carry-in value $c_0$ is one. The addition circuitry has a sequence of full adders. The first full adder receives the least significant bit of the numbers A and B and the initial carry-in value $c_0$. It produces the least significant bit of the summation signal S or S' and a first carry-in value $c_1$. The second full adder has the binary weight of one, and receives the first carry signal $c_1$ and the bit values $a_1$ and $b_1$. The second full adder produces as an output $S_1$ or $S'_1$ and the second carry value $c_2$. There will generally be as many full adders serially interconnected as there are bits in the numbers A and B.

The relationship of the bits $s_i$ output from the full adders when the initial carry-in $c_0$ is zero to the bits $a_i$ and $b_i$ received is illustrated in equation 1. In this equation i represents the binary weight, $a_i$ is the ith bit of A, $b_i$ is the ith bit of B, $g_i$ is the bit generate, $p_i$ is the bit propagate, $c_i$ is the carry produced by the ith full adder and $s_i$ is the ith bit of S, the sum of A and B.

Equation 2 illustrates the relationship of the output of the ith full adder to the bit values $a_i$ and $b_i$ when the initial carry value $c_0$ is one. The symbol i represents the binary weight of a bit. $a_i$ is the ith bit of A, $b_i$ is the ith bit of B, $g_i$ is the bit generate, $p_i$ is the bit propagate, $c_i$ is the carry produced by the ith full adder and $S'_i$ is the ith bit of the number S' which is the sum of A, B and 1.

Addition circuitry is commonly used to round a fractional number up or down to the nearest full number. By controlling the value of the initial carry-in value $c_0$ the output from the circuitry can represent either the rounded up sum S', i.e. A+B+1 or the rounded down sum A, i.e., A+B.

Addition circuitry is also commonly used to find the difference between two binary numbers A and B where A and B are expressed as two's complement. When a number is expressed in two's complement format, it can be negated by either inverting all the bits of the number and then adding one or by subtracting one and then inverting all the bits of that number. Consequently, by performing appropriate inversions, addition circuitry can be used to create an output signal which represents a difference of two numbers.

In current video encoding standards, it is often necessary to find the absolute difference (i.e., unsigned (+ve) difference) between two numbers. According to the MPEG video encoding standards, the video is encoded by comparing how a picture changes frame by frame rather than reproducing the whole picture frame by frame. It is consequently necessary to determine whether a picture has changed from one frame to the next. This may be achieved by comparing a block of pixels in a frame to a number of blocks in the next frame to establish the block with the smallest difference. A number can be used to represent the attributes of a pixel. As attributes of the pixel change so does the number. Consequently, by comparing such numbers for one frame with the equivalent numbers for the next frame it can be deduced how the picture has changed from one frame to the next. It is therefore important in video encoding to be able to find the difference between two numbers. Normally, two separate circuits will be provided, one circuit that calculates the value of the first number minus the second number and another circuit that calculates the value of the second number minus the first number.

FIG. 2 illustrates in more detail addition circuitry 30 for summing A and B to produce S. The bit $a_0$ and the bit $b_0$ are supplied as inputs to an AND gate $2_0$ which produces the bit generate $g_0$. The bit $a_0$ and the bit $b_0$ are also supplied as inputs to an XOR gate $4_0$ which produces $s_0$ as its output. The bit $a_1$ and the bit $b_1$ are supplied as inputs to an XOR gate $4_1$ which produces the first bit propagate signal $p_1$. The bit generate signal $g_0$ and the first bit propagate signal $p_1$ are supplied as inputs to an XOR gate $24_1$ which produces the bit $s_1$. The bit $a_1$ and the bit $b_1$ are also supplied as inputs to an OR gate $6_1$ which supplies its output as a first input to an AND gate $8_1$. The second input of the AND gate $8_1$ is received from the output of the AND gate $2_0$. The output of the AND gate $8_1$ provides a first input to an OR gate $10_1$. The second input to the OR gate $10_1$ is received from an AND gate $2_1$ which receives as inputs the bit $a_1$ and the bit $b_1$. The bit $a_2$ and the bit $b_2$ are supplied as inputs to an XOR gate $4_2$ which provides its output as a first input to a XOR gate $24_2$. The second input to the XOR gate $24_2$ is provided by the output of the OR gate $10_1$. The output of the XOR gate $24_2$ provides the bit $S_2$. The bit $a_2$ and the bit $b_2$ are also combined in an OR gate $6_2$ to produce a first input to an AND gate $8_2$ which receives as a second input the output from the OR gate $10_1$. The output from the AND gate $8_2$ supplied as a first input to a OR gate $10_2$. The second input to the OR gate $10_2$ is supplied by a AND gate $2_2$ which receives as an input the bits $a_2$ and $b_2$.

The output of the OR gate $10_2$ is supplied as a first input to a XOR gate $24_3$. The second input to the XOR gate $24_3$ is supplied by the output of an XOR gate $4_3$ which receives as inputs the bit $a_3$ and the bit $b_3$. The output of the XOR gate $24_3$ provides the bit $s_3$. An AND gate $2_3$ also receives the bits $a_3$ and $b_3$ and provides its output as a first input to a OR gate $16_3$. The second input to the OR gate $16_3$ is provided by an AND gate $14_3$ which receives as a first input the output from the AND gate $2_2$ and as a second input the output from an OR gate $6_3$ which receives as inputs the bit $a_3$ and bit $b_3$. The output from the OR gate $6_3$ is also provided as a first input to an AND gate $12_3$ which receives as a second input the output from the OR gate $6_2$.

The output from the AND gate $12_3$ is supplied as a first input to an AND gate $8_3$ which receives as a second input the output from the OR gate $10_1$. The output from the AND gate $8_3$ and the output from the OR gate $16_3$ are combined in an OR gate $10_3$. A XOR gate $24_4$ receives as a first input the output from the OR gate $10_3$ and as a second input the output from an XOR gate $4_4$ which receives as inputs the bit $a_4$ and the bit $b_4$. The XOR gate $24_4$ produces the bit $S_4$. An OR gate $6_4$ receives an inputs the bit $a_4$ and bit $b_4$ and provides its output as a first input to an AND gate $8_4$. The AND gate $8_4$ receives as its second input the output from the OR gate $10_3$ and provides its output to a OR gate $10_4$. The other input to the OR gate $10_4$ is provided by an AND gate $2_4$ which receives as inputs the bit $a_4$ and the bit $b_4$. An XOR gate $24_5$ produces the bit $s_5$ and receives as a first input the output from the OR gate $10_4$ and receives as a second input the output from an XOR gate $4_5$ which receives as inputs the bit $a_5$ and the bit $b_5$. An AND gate $12_5$ receives as a first input the output from the OR gate $6_4$ and an output from an OR gate $6_5$ which receives as inputs the bit $a_5$ and the bit $b_5$.

An OR gate $16_5$ receives as a first input the output from an AND gate $2_5$ which receives as inputs the bit $a_5$ and the bit $b_5$ and as a second input receives the output from an AND gate $14_5$ which itself receives as inputs the output from the AND gate $2_4$ and the output from the OR gate $6_5$. The output from the AND gate $12_5$ is combined with the output from the OR gate $10_3$ in an AND gate $8_5$ to produce a first input to a first OR gate $10_5$. The second input to the OR gate $10_5$ is provided by the output from the OR gate $16_5$. The output from the OR gate $10_5$ is provided as a first input to the XOR gate $24_6$. The XOR gate $24_6$ receives as a second input the output from the XOR gate $4_6$ which receives as inputs the bit $a_6$ and the bit $b_6$. The XOR gate $24_6$ produces as an output the bit $S_6$.

An OR gate $6_6$ receives as its inputs the bit $a_6$ and the bit $b_6$ and supplies its output as a first input to an AND gate $12_6$. The second input to the AND gate $12_6$ is supplied by the output of the AND gate $12_5$ and the output of the AND gate $12_6$ is supplied as a first input to an AND gate $8_6$. The output from the OR gate $6_6$ is supplied as a first input to an AND gate $14_6$. The AND gate $14_6$ receives as a second input the output from the OR gate $16_5$ and provides an output signal to a first input of an OR gate $16_6$. The second input to the OR gate $16_6$ is supplied by an AND gate $2_6$ which receives as inputs the bit $a_6$ and the bit $b_6$. The AND gate $8_6$ which receives as a first input the output from the AND gate $12_6$ receives as a second input the output from the OR gate $10_3$ and provides its output as a first input to an OR gate $10_6$. The second input to the OR gate $10_6$ is provided by the output of the OR gate $16_6$. The output of the OR gate $10_6$ is provided as a first input to an XOR gate $24_7$. The XOR gate $24_7$ receives as a second input the output from an XOR gate $4_7$ which receives as inputs the bit $a_7$ and the bit $b_7$. The XOR gate $24_7$ produces the bit $s_7$.

The bit $a_7$ and the bit $b_7$ are combined in an OR gate $6_7$ to produce a first input to an AND gate $18_7$ which receives as a second input the output from the OR gate $6_6$. The output from the OR gate $6_7$ is supplied as a first input to an AND gate $20_7$. The AND gate $20_7$ receives as a second input the output from the AND gate $2_6$. The output from the AND gate $20_7$ is supplied as a first input to an OR gate $22_7$. The second input to the OR gate $22_7$ is provided by a AND gate $2_7$ which receives as its inputs the bit signal $a_7$ and the bit signal $b_7$.

An AND gate $14_7$ receives as its inputs the output from the AND gate $18_7$ and the output from the OR gate $16_5$ and provides its output as a first input to an OR gate $16_7$. The second input to the OR gate $16_7$ is supplied by the output of the OR gate $22_7$. The output of the OR gate $16_7$ is provided as a first input to an OR gate $10_7$. An AND gate $12_7$ receives as its inputs the output from the AND gate $12_5$ and the output from the AND gate $18_7$. The output from the AND gate $12_7$ is supplied as a first input to the AND gate $8_7$. The AND gate $8_7$ receives as a second input the output from the OR gate $10_3$. The output from the AND gate $8_7$ is supplied as a second input to the OR gate $10_7$. The output of the OR gate $10_7$ produces the last carry value $c_8$.

FIG. 3 illustrates addition circuitry for summing the numbers A, B and $c_0$. The value of $c_0$ may be zero or one. When the value of $c_0$ is zero the circuitry of FIG. 3 is functionally equivalent to that of FIG. 2 and the output value from the circuit is S. When the value of the initial carry-in value $c_0$ is one, the circuitry produces an output signal S'. The summation circuitry illustrated in FIG. 3 has addition circuitry 30 illustrated in FIG. 2 and has additional circuitry 26 enclosed by the dotted line. The additional circuitry 26 has an OR gate $6_0$ for receiving the bit $a_0$ and the bit $b_o$. The OR gate $6_0$ provides a first input to a first AND gate $8_0$. The second input to the AND gate $8_0$ is provided by $c_0$. The output from the AND gate $8_0$ is provided as a first input to an OR gate $10_0$. The second input to the OR gate $10_0$ is provided by the output of the AND gate $2_0$. The output of the OR gate $10_0$ provides one of the inputs to an XOR gate $24_1$ and one of the inputs to the AND gate $8_1$ and in place of the output from the AND gate $2_0$.

It will be appreciated that the circuitry in FIG. 3 can produce as its output the value A+B or the value A+B+1 depending on the value of $c_0$. It cannot however quickly switch between producing an output A+B and producing an output A+B+1. The value of $c_0$ when it changes must pass through the succession of gates $8_i$, $10_i$ before it can effect a change in the output signal.

It would be desirable to provide circuitry which can quickly change between producing an output value A+B and output value A+B+1 or which can simultaneously provide an output value A+B and an output value A+B+1.

SUMMARY OF THE INVENTION

According to one aspect of the invention there is provided circuitry for adding a first binary number (A) having a plurality of bits ($a_0$, $a_1$, . . . ) to a second binary number (B) having a plurality of bits ($b_0$, $b_1$, . . . ) to produce a third binary number (A+B) having a plurality of bits ($s_0$, $s_1$, . . . ) and/or a fourth binary number (A+B+1) having a plurality of bits ($s_0'$, $s_1'$ . . . ) and corresponding to the addition of the third binary number and one.

The circuitry further includes a plurality of stages wherein each stage has a first input for receiving a bit ($a_i$) of the first binary number (A), a second input for receiving a bit ($b_i$) of the second binary number (B) having the same binary weight (i) as the bit received at the first input and output means for producing a bit ($s_i$) of the third binary number (A+B) and/or a bit ($s'_i$) of the fourth binary number (A+B+ 1), wherein said output means comprises Exclusive OR means for combining a first signal and a second signal to produce a bit of the third binary number and the first signal and a third signal to produce a bit of the fourth binary number wherein said third signal is equivalent to said second signal if both the bits received at the first and second inputs have a LOW logic value, or for any stage having a lower binary weight, both the bits received at the first and second inputs have a LOW logic value and is otherwise equivalent to a predetermined logic value.

Said second signal for a first stage can correspond to a high logic level if the bit of the first binary number and the bit of the second binary number received at the first and second inputs of the first stage are both high or, for a second stage having a lower binary weight, both the first and second bits received at the first and second inputs have a high logic value and in none of the stages intermediate between said first and second stage are the first and second bits input at the first and second inputs both low logic values.

Said second signal for a stage can correspond to a high logic value if the stage generates or if a preceding stage generates and one of the intermediate stages kill.

Ideally, each stage produces an output bit of the third binary number according to $p_m r c_m$ and the output bit of the fourth binary number according to $p_m r(c_{m:0} + k_{m:0})$ where $c_{m:0}$ is the group carry signal and $k_{m:0}$ is the group carry signal for the stage having binary weight m, and $p_m$ is the propagate bit.

According to another aspect of the invention there is provided addition circuitry for adding a first binary number (A) having a plurality of bits ($a_0, a_1, \ldots$) to a second binary number (B) having a plurality of bits ($b_0, b_1, \ldots$) to produce a third binary number (A+B) having a plurality of bits ($s_0, s_1, \ldots$) and/or a fourth binary number (A+B+1) having a plurality of bits ($s_0', s_1', \ldots$) and corresponding to the third binary number plus one. The circuitry includes a plurality of stages wherein each stage has a first input for receiving a bit ($a_i$) of the first binary number (A) and a second input for receiving a bit ($b_i$) of the second binary number (B) having the same binary weight (i) as the bit received at the first input and output means for producing a bit ($s_i$) of the third binary number (A+B) and/or a bit ($s_i$) of the fourth binary number (A+B+1). The output means includes Exclusive OR means for combining a first signal and a second signal to produce a bit of the third binary number and the first signal and a third signal to produce a bit of the fourth binary number and logic circuitry arranged to receive the second signal and a signal from the logic circuitry from the preceding stage and produce the third signal, wherein the logic circuitries of the plurality of stages emulate the application of a HIGH carry signal provided to the first stage of lowest binary weight.

The logic circuitry can include an AND gate and an OR gate. The AND gate in the preceding stage supplies a first input to the OR gate and the second input to the OR gate is the second signal.

The AND gate in each stage can produce an output with a low logic value if both the first and second bit received at that stage are low or both the first and second bit received at any preceding stage are low.

The exclusive OR means can include an XOR gate the output of which provides the bit of the third binary number or the bit of the fourth binary number in dependence on the value of a received control signal, wherein said control signal gates the first input to the OR gate of said logic circuitry.

According to a still further aspect of the invention there is provided addition circuitry for adding a first binary number (A) having a plurality of bits (a0, $a_1, \ldots$) to a second binary number (B) having a plurality of bits ($b_0, b_1, \ldots$) to produce a third binary number (A+B) having a plurality of bits ($s_1, s_1, \ldots$) and/or a fourth binary number (A+B+1) having a plurality of bits ($s_0', s_1', \ldots$) and corresponding to the third binary number plus one. The circuitry includes a plurality of stages wherein each stage has a first input for receiving a bit ($a_i$) of the first binary number (A) and a second input for receiving a bit ($b_i$) of the second binary number (B) having the same binary weight (i) as the bit received at the first input and output means for producing a bit ($s_i$) of the third binary number (A+B) and/or a bit ($s_i$) of the fourth binary number (A+B+1). The output means includes Exclusive OR means for combining a first signal and a second signal to produce a bit of the third binary number and the first signal and a third signal to produce a bit of the fourth binary number and logic circuitry arranged to logically OR the second signal and a signal received from the logic circuitry of the preceding stage to produce the third signal and to provide a signal to the logic circuitry of the next stage dependent upon the logic value of the signal received from the preceding stage and the first and second bits received by the stage.

In one embodiment, the signal provided by the logic circuitry to the next stage has a high logic value if the signal received from the logic circuitry at the preceding stage has a high logic value and one or both of the first and second bits have a high logic value.

According to a yet another aspect of the invention there is provided circuitry for adding a first binary number having a plurality of bits to a second binary number having a plurality of bits to produce a third binary number having a plurality of bits and a fourth binary number having a plurality of bits and corresponding to the third binary number plus one. The circuitry includes a plurality of stages wherein each stage includes:

a first input for receiving a bit of the first binary number;

a second input for receiving a bit of the second binary number having the same binary weight as the bit received at the first input;

first output means for producing a bit of the third binary number and comprising exclusive OR means for combining a first signal and a second signal to produce a bit of the third binary number; and second output means for producing a bit of the fourth binary number comprising exclusive OR means for combining the first signal and a third signal to produce a bit of the fourth binary number, wherein said first and second output means produce the third and fourth binary numbers substantially simultaneously.

According to a still further aspect of the invention there is provided circuitry for adding a first binary number having a plurality of bits to a second binary number having a plurality of bits to produce a third binary number having a plurality of bits or a fourth binary number having a plurality of bits and corresponding to the third binary number plus one. The circuitry includes a plurality of stages wherein each stage includes:

a first input for receiving a bit of the first binary number;

a second input for receiving a bit of the second binary number having the same binary weight as the bit received at the first input; and output means for producing a bit of the third binary number or a bit of the fourth binary number, wherein said output means comprises exclusive OR means for combining a first signal and a second signal to produce a bit of the third binary number or the first signal and the third signal to produce a bit of the fourth binary number, said exclusive OR means operating in dependence on the value of a single independent control signal being supplied directly to said output stage.

According to a still yet another aspect of the invention there is provided circuitry for adding a first binary number having a plurality of bits to a second binary number having a plurality of bits to produce a third binary number having a plurality of bits or a fourth binary number having a plurality of bits and corresponding to the third binary number plus one. The circuitry includes a plurality of stages wherein each stage includes:

a first input for receiving a bit of the first binary number;

a second input for receiving a bit of the second binary number having the same binary weight as the bit received at the first input; and output means for producing a bit of the third binary number or a bit of the fourth binary number, wherein said output means comprises exclusive OR means for combining a first signal and a second signal to produce a bit of the third binary number or the first signal and a third signal to produce a bit of the fourth binary number, said exclusive OR means being supplied by logic circuitry comprising an AND gate and an inverter which are supplied in parallel with said second signal, said logic circuitry being operable to produce said second or third signal in dependence upon a control signal.

According to a further aspect of the invention there is provided circuitry for adding a first binary number having a plurality of bits to a second binary number having a plurality of bits to produce a third binary number having a plurality of bits or a fourth binary number having a plurality of bits and corresponding to the third binary number plus one. The circuitry includes a plurality of stages wherein each stage includes:

a first input for receiving a bit of the first binary number;

a second input for receiving a bit of the second binary number having the same binary weight as the bit received at the first input; and output means for producing a bit of the third binary number or a bit of the fourth binary number, wherein said output means comprises exclusive OR means for combining a first signal and a second signal to produce a bit of the third binary number or a first signal and a third signal to produce a bit of the fourth binary number, said exclusive OR means being supplied by logic circuitry comprising an AND gate and an inverter which are supplied in parallel with said second signal, said logic circuitry being operable to produce said second or third signal in dependence upon the value of a control signal supplied from the most significant stage of carry and propagation circuitry disposed between said input and said output means.

BRIEF DESCRIPTION OF THE DRAWINGS

For a better understanding of the present invention and to understand how the same may be brought into effect reference will now be made by way of example only to the accompanying figures.

FIGS. 9A–9F are equations 3 through 6c corresponding to the embodiments of the invention illustrated in FIGS. 2 through 7.

DETAILED DESCRIPTION OF THE INVENTION

Figure 2:
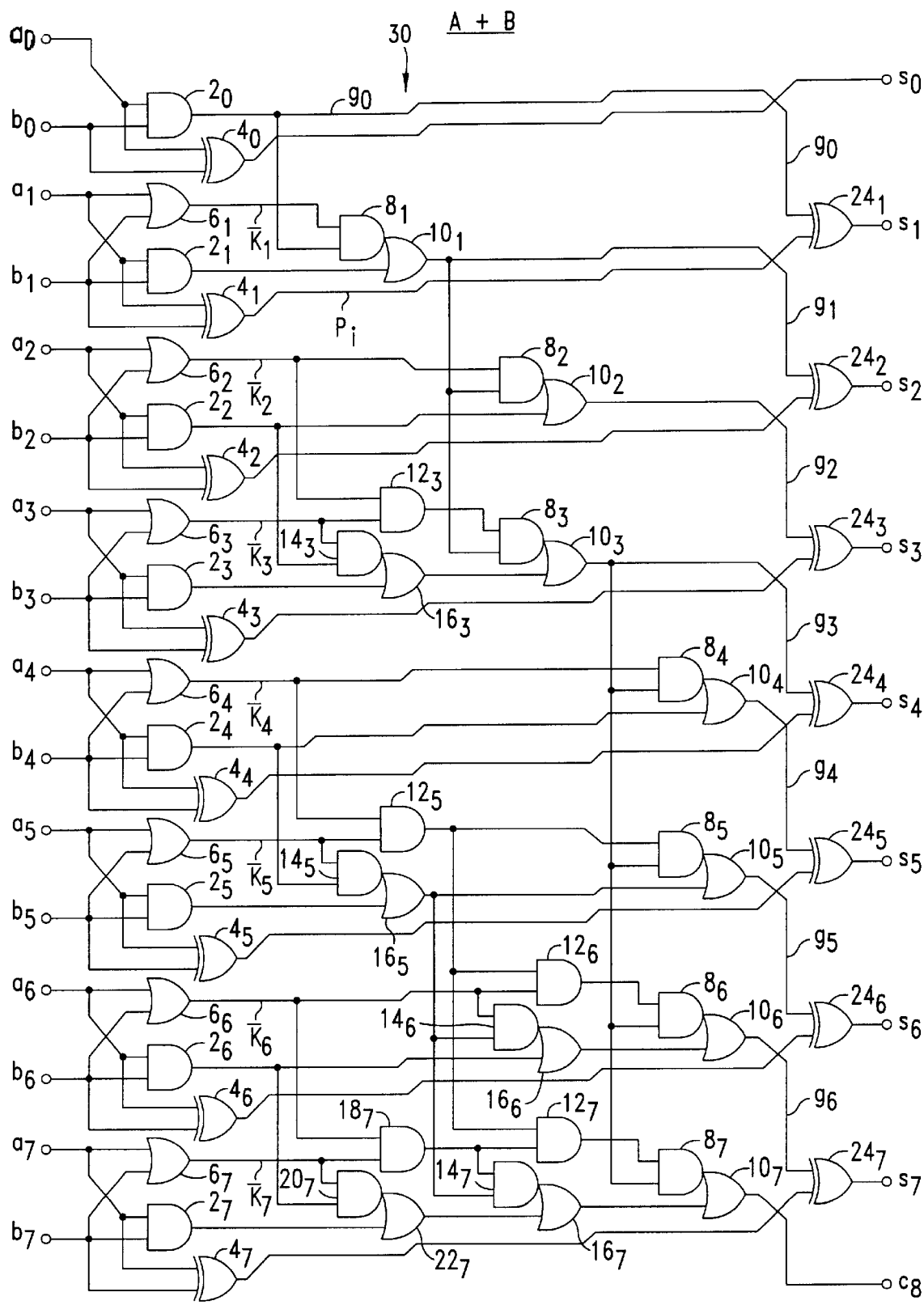
FIG. 2 illustrates prior art circuitry for producing A+B in more detail.
Figure 4:
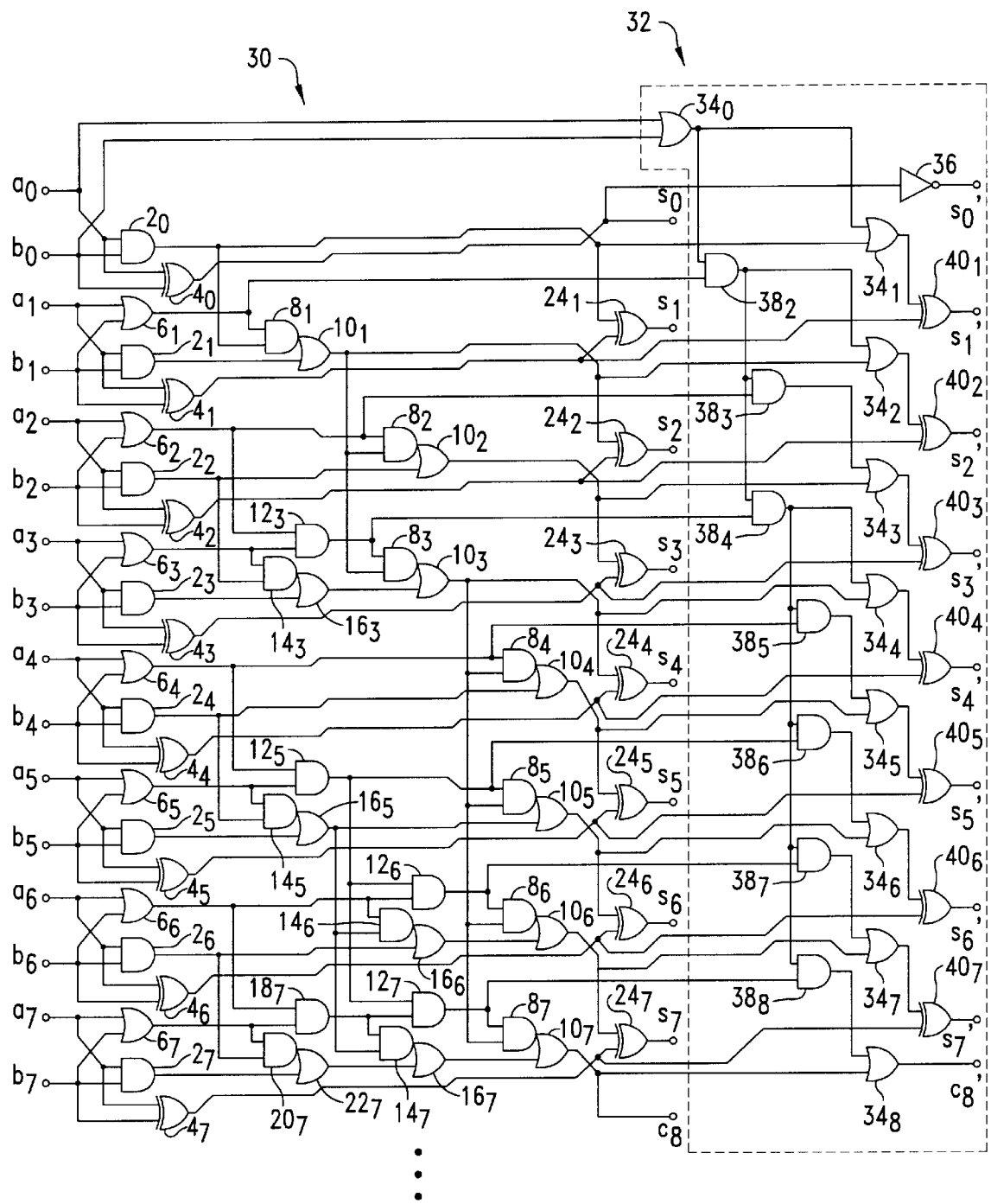
FIG. 4 illustrates addition circuitry for simultaneously producing A+B and A+B+1 in accordance with a first embodiment of the present invention.

FIG. 4 illustrates addition circuitry suitable for producing simultaneously the output S having bit values $s_i$ corresponding to the addition of A and B and producing the number S', having bit values $s'_i$, corresponding to the summation of the numbers A, B and 1. The circuitry illustrated in FIG. 4 has summation circuitry 30 equivalent to that illustrated in FIG. 2 and includes additional circuitry 32, the boundary of which is illustrated by a dashed line. The additional circuitry 32 produces the output values $s'_i$. The additional circuitry has an inverter 36, and OR gate $34_0$, an OR gate $34_1$, an XOR gate $40_1$, an AND gate $38_2$, an OR gate $34_2$, an XOR gate $40_2$, an AND gate $38_3$, an OR gate $34_3$, an XOR gate $40_3$, an AND gate $38_4$, an OR gate $34_4$, an XOR gate $40_4$, an AND gate $38_5$, an OR gate $34_5$, and XOR gate $40_5$ an AND gate $38_6$, an OR gate $34_6$, an XOR gate $40_6$, an AND gate $38_7$, an OR gate $34_7$, an XOR gate $40_7$, an AND gate $38_8$, and an OR gate $34_8$. The inverter 36 receives as its input the output from the XOR gate $4_0$ and produces as its output the bit $s'_0$. The OR gate $34_0$ receives as its inputs the bit $a_0$ and the bit $b_0$. The OR gate $34_1$ receives as its inputs the output from the OR gate $34_0$ and the output from the AND gate $2_0$.

The XOR gate $40_1$ receives as its inputs the output from the OR gate $34_1$ and the output from the XOR gate $4_1$. The output from the XOR gate $40_1$ is the bit $s'_1$. The AND gate $38_2$ receives as its input the output from the OR gate $34_0$ and the output from the OR gate $6_1$. The OR gate $34_2$ receives as its inputs the output from the AND gate $38_2$ and the output from the OR gate $10_1$. The XOR gate $40_2$ receives as its inputs the output from the OR gate $34_2$ and the output from the XOR gate $4_2$. The output from the XOR gate $40_2$ is the bit $s'_2$. The AND gate $38_3$ receives as its inputs the output from the AND gate $38_2$ and the output from the OR gate $6_2$. The OR gate $34_3$ receives as its inputs the output from the AND gate $38_3$ and the output from the OR gate $10_2$.

The XOR gate $40_3$ receives as its inputs the output from the OR gate $34_3$ and the output from the XOR gate $4_3$. The output of the XOR gate $40_3$ provides the bit $s'_3$. The AND gate $38_4$ receives as its inputs the output from the AND gate $38_2$ and the output from the AND gate $12_3$. The OR gate $34_4$ receives as its inputs the output from the AND gate $34_4$ and the output from the OR gate $10_3$. The XOR gate $40_4$ receives as its inputs the output from the OR gate $34_4$ and the output from the XOR gate $4_4$. The output from the XOR gate $40_4$ is the bit $s'_4$. The AND gate $38_5$ receives as its inputs the output from the AND gate $38_4$ and the output from the OR gate $6_4$. The OR gate $34_5$ receives as its inputs the output from the AND gate $38_5$ and the output from the OR gate $10_4$. The XOR gate $40_5$ receives as its inputs the output from the OR gate $34_5$ and the output from the XOR gate $4_5$. The output from the XOR gate $40_5$ produces the bit $s'_5$. The AND gate $38_6$ receives as its inputs the output from the AND gate $38_4$ and the output from the AND gate $12_5$. The OR gate $34_6$ receives as its inputs the output from the AND gate $38_6$ and the output from the OR gate $10_5$.

The XOR gate $40_6$ receives as its inputs the output from the OR gate $34_6$ and the output from the XOR gate $4_6$. The output from the XOR gate $40_6$ provides the bit $s'_6$. The AND gate $38_7$ receives as its inputs the output from the AND gate $38_4$ and the output from the AND gate $12_6$. The OR gate $34_7$ receives as its inputs the output from the AND gate $38_7$ and the output from the OR gate $10_6$. The XOR gate $40_7$ receives as its inputs the output from the OR gate $34_7$ and the output from the XOR gate $4_7$. The output from the XOR gate $40_7$ provides the bit s'$_7$. The AND gate $38_8$ receives as its inputs the output from the AND gate $38_4$ and the output from the AND gate $12_7$. The OR gate $34_8$ receives as its inputs the output from the AND gate $38_8$ and the output from the OR gate $10_7$. The OR gate $34_8$ produces the carry signal c$_8$' that is the carry signal having a binary weight of 8 produced for the sum A+B+1.

Figure 5:
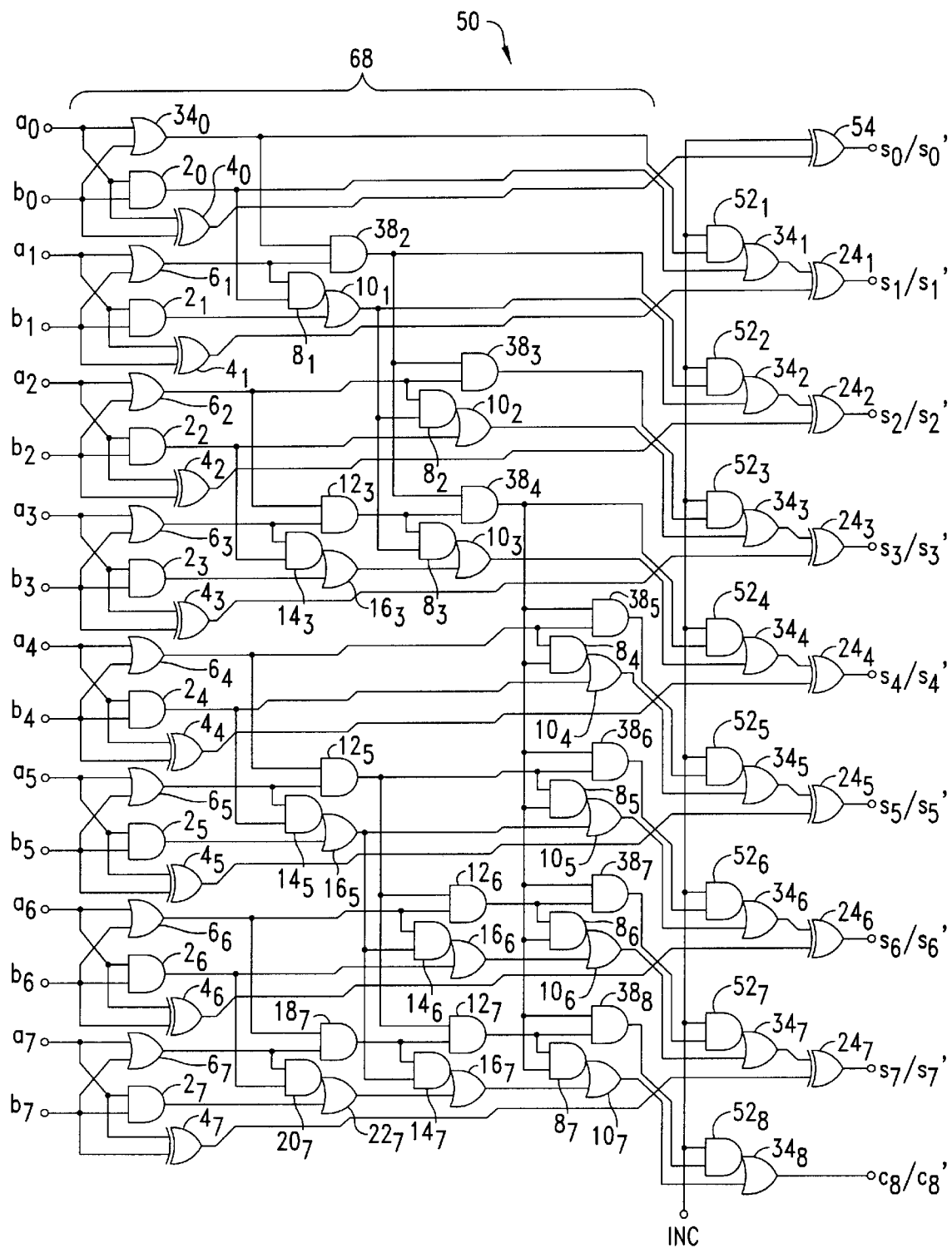
FIG. 5 illustrates addition circuitry according to a second embodiment of the present invention for selectively producing A+B or A+B+1.

FIG. 5 illustrates summation circuitry 50 which receives a control signal INC. The summation circuitry 50 sums the number A and the number B to produce either the number S, i.e. A+B, or the number S', i.e. A+B+1 depending upon the value of a control signal INC. When the value of INC is zero, the output of this summation circuitry 50 is the sum of A and B, i.e. S. When the value of INC is one, the summation circuitry 50 produces as its output the value of A+B+1, i.e., S'. The summation circuitry 50 illustrated in FIG. 5 is an adaptation of the circuitry illustrated in FIG. 2 and where like numerals are used they refer to like features. The summation circuitry 50 can be considered to have a number of separate stages where a stage having binary weight i receives input bits $a_i$ and $b_i$ binary weight i and produces outputs $s_i$ or s'$_i$ having binary weight i. For example, the i=0 stage produces the output bit $s_0$ or s'$_0$ and the i=7 stage produces the output signal $s_7$ or s'$_7$. Comparing the summation circuitry 50 illustrated in FIG. 5 with circuitry illustrated in FIG. 2 it will be appreciated that the stage corresponding to i=0 has as additional circuitry an OR gate $34_0$ and an XOR gate 54. The i=1 stage has as additional circuitry an AND gate $52_1$ and an OR gate $34_1$. The i=2 stage has as additional circuitry an AND gate $38_2$, an AND gate $52_2$ and an OR gate $34_2$. The i=3 stage has as additional circuitry an AND gate $38_3$, an AND gate $52_3$ and an OR gate $34_3$. The i=4 stage has as additional circuitry an AND gate $38_4$, and AND gate $52_4$ and an OR gate $34_4$. The i=5 stage has as additional circuitry an AND gate $38_5$, an AND gate $52_5$ and an OR gate $34_5$. The i=6 stage has as additional circuitry the AND gate $38_6$, an AND gate $52_6$ and the AND gate $34_6$. The i=7 stage has as additional circuitry the AND gate $38_7$, an AND gate $52_7$ and the OR gate $34_7$. The i=8 stage which produces the final carry value has as additional circuitry the AND gate $38_8$, an AND gate $52_8$ and the OR gate $34_8$.

It will be appreciated that the above-mentioned additional circuitry in the summation circuitry 50 differs only from the additional circuitry 32 described in relation to FIG. 4 in that the inverter 36 has been replaced by the XOR gate 54 which receives as its second input the signal INC, and in the provision of the additional AND gates $52_i$ where i=1,2 . . . 8. The AND gate $52_1$ receives as a first input the output from the OR gate $34_0$ and as a second input signal INC. It supplies its output to the OR gate $34_1$. The AND gate $52_i$, where i=2,3 . . . 8, receives as a first input the output from the AND gate $38_i$ and as a second input signal INC. The output from the gate $52_i$, where i=2,3 . . . 8, is supplied as an input to the OR gate $34_i$.

Formalism for Addition

Let A and B be binary words each of N bits, and let $a_i$ and $b_i$ be bits of those words such that $a_0$ and $b_0$ are the least significant bits and $a_{N-1}$, and $b_{N+1}$ are the most significant bits. The addition process at each bit position can be defined as follows:

$g_i = a_i \cdot b_i$
$p_i = a_i \oplus b_i$
$k_i = a_i + b_i$
$c_{i+1} = g_i + k_i \cdot c_i$
$s_i = p_i \oplus c_i$ where '.' is binary AND, $\oplus$ is binary EXOR, and overline indicates binary NOT.

$c_1$ is a binary carry bit. Each bit position receives a carry from the adjacent less significant bit position and passes a carry to the adjacent more significant bit position. The binary weight of $c_i$ is the same as that of bits $a_i$ and $b_i$.

$s_i$ is the sum bit; the corresponding word S is the result of the addition of A and B.

According to the convention used herein:

$g_i$ is called the bit generate condition, because a value 1 indicates that the bits $a_i$ and $b_i$ produces an outgoing carry, irrespective of the incoming carry.

$p_i$ is called the bit propagate condition because a value 1 indicates that the bits $a_i$ and $b_i$ produces an outgoing carry only if there is an incoming carry.

$k_i$ is called the bit kill condition, because a value 1 indicates that the bits $a_i$ and $b_i$ produces no outgoing carry, irrespective of the incoming carry.

Figures 1A, 1B, 1C:
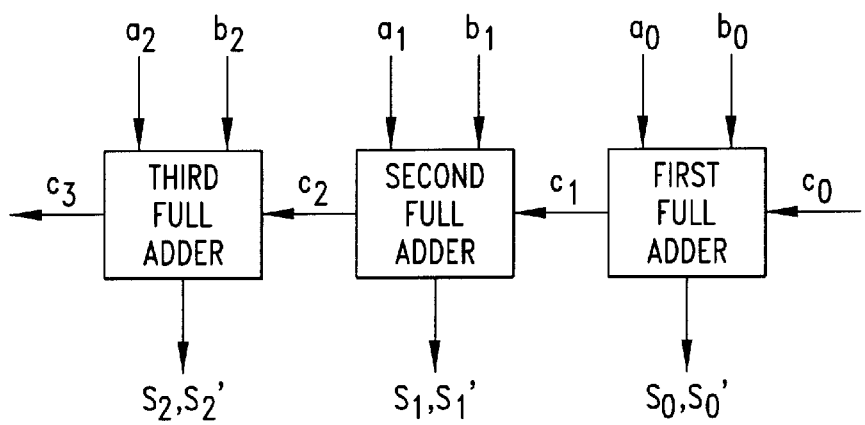
FIGS. 1A–1C illustrate prior art circuitry for producing A+B or A+B+1 and associated equations 1 and 2.
Figure 3:
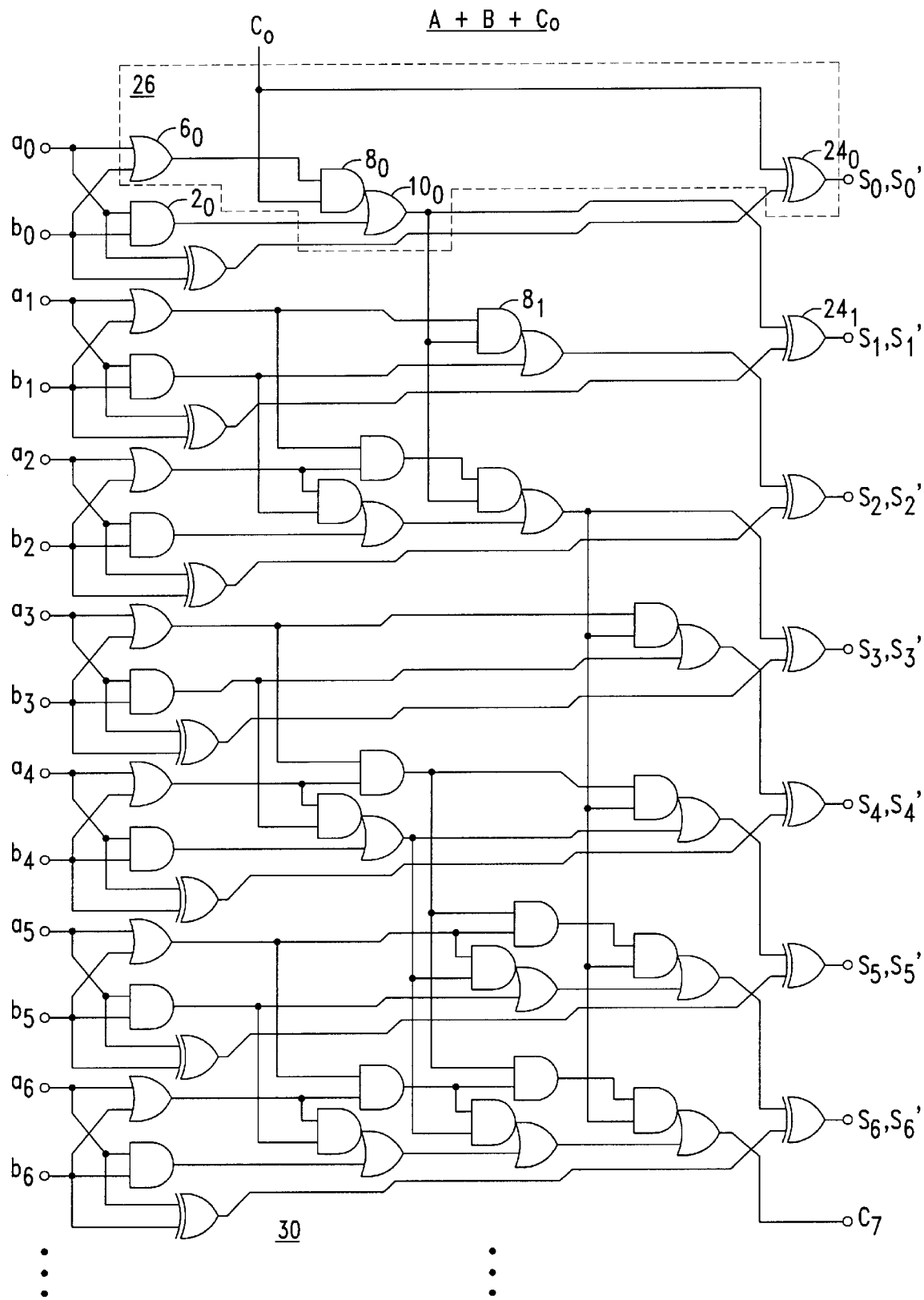
FIG. 3 illustrates circuitry, known in the prior art, suitable for producing A+B or A+B+1 in more detail.

This formalism embodies a sequential propagation of carries from least significant to most significant bit position as illustrated in FIG. 1. Frequently a literal implementation of this sequentiality yields a circuit which is too slow. The adder may be accelerated by forming "group generate" and "group kill" (or optionally "group propagate") terms which represent the collective treatment of carries across a number of adjacent bit positions. A common form of accelerated adder is the prefix construction, one form of which is described in FIGS. 2 and 3.

A group generate is expressed as $g_{i:j}$. A value of one indicates that the sequence of stages having binary weight j, j+1, . . . i-1, i where j<i in combination produce an output carry value ($c_{i+1}$) of one irrespective of the input of the carry value ($c_j$). A stage having a binary weight i is the part of the summation circuitry which receives the bits $a_i$ and $b_i$ and produces the output $s_i$ or s'$_i$.

A group kill is expressed as $k_{i:j}$. A value of one indicates that the sequence of stages having binary weight j, j+1, . . . i-1, i in combination produces an output carry value ($c_{i+1}$) of zero irrespective of the input carry value ($c_j$).

A group carry is expressed as $c_{i+1:j}$. It represents the output carry value of the combination of a sequence of stages having binary weight j, j+1, . . . i-1, i, where the combination of stages receives an input carry value ($c_{j:0}$).

The bit $s_i$ of the sum S of A and B can thus be expressed as shown in equation 3.

The functionality of embodiments of the invention will now be explained. Reference is made to equation 4 in which a bit operator "*" is defined. The group carry values $c_{i:0}$ can be produced from bit kills and bit generates as shown in equation 5. These equations define a binary tree of cells which is implemented in the circuitries of FIGS. 2, 3, 4, 5, 6 and 7. Referring to these figures, the outputs of the OR gates $6_i$ where i equals 0, 1 . . . 7 produce the inverted bit kill values $k_i$. The outputs of the AND gates $2_i$ where i equals 0, 1, 2, . . . 7 produce the bit generate values $g_i$. The outputs of the XOR gates $4_i$ where i equals 0, 1, 2 . . . 7 produce the bit propagate values $p_i$. The outputs of the OR gate $10_i$ where i equals 1, 2, 3 . . . 7 produce the carry values $c_{i+1:0}$ respectively. The output of the AND gate $12_3$ produces the inverted group kill $k_{3:2}$ and the output of the OR gate $16_3$ produces the group carry value $c_{4:2}$. The output of the AND gate $12_5$ produces the inverted group kill $k_{5:4}$ and the output of the OR gate $16_5$ produces the group carry value $c_{6:4}$. The output of the AND gate $12_6$ produces the inverted group kill $k_{6:4}$ and the output of the OR gate $16_6$ produces the group carry value $c_{7:4}$. The output of the AND gate $18_7$ produces the inverted group kill $k_{7:6}$ and the output of the OR gate $22_7$ produces the carry value $c_{8:6}$. The output of the AND gate $12_7$ produces the inverted group kill $k_{7:4}$ and the output of the OR gate $16_7$ produces the group carry value $c_{8:4}$.

It will be realised that the bit operation "*" is achieved by the use of two AND gates and an OR gate in combination. Referring back to equation 4, the bit $k_i$ is provided as a first input to a first AND gate and as a first input to a second AND gate, the bit $k_j$ is supplied as a second input to the first AND gate, the bit $g_j$ is supplied as a second input to the second AND gate, the output of the second AND gate is supplied as a first input to an OR gate, and the bit $g_i$ is supplied as a second input to the OR gate. The output of the first AND gate gives inverted group kill $k_{i:j}$ and the output of the OR gate provides a group carry value $c_{i+1:j}$. The first AND gate is used to produce the inverted group kill and the combination of the second AND gate and the OR gate is used to produce the group carry.

Referring to FIG. 4, it will be appreciated that additional circuitry 32 comprises a plurality of stages each of which produces an output bit $s'_j$. The pairs of AND gates $38_i$ and OR gate $34_i$ where i equals 2, 3, 4 . . . 8 to produce group carry values $c_{i+1:0}$. The additional circuitry performs a function equivalent to replacing the value illustrated in equation 6a in the equations with the value illustrated in equation 6b. It should be appreciated that the additional circuitry 32 effectively emulates the introduction of a carry value $c_0=1$ at the first stage of a first full adder.

Referring to FIG. 5, the additional circuitry previously described in relation to that figure performs a function equivalent to replacing the term illustrated in equation 6a that are used equations 5 with the term illustrated in equation 6c. When INC is zero the summation circuitry produces the value A+B and when INC is one the additional circuitry emulates the introduction of a carry value $c_0=1$ at the first full adder and the summation circuitry 50 produces the output value A+B+1.

Figure 6:
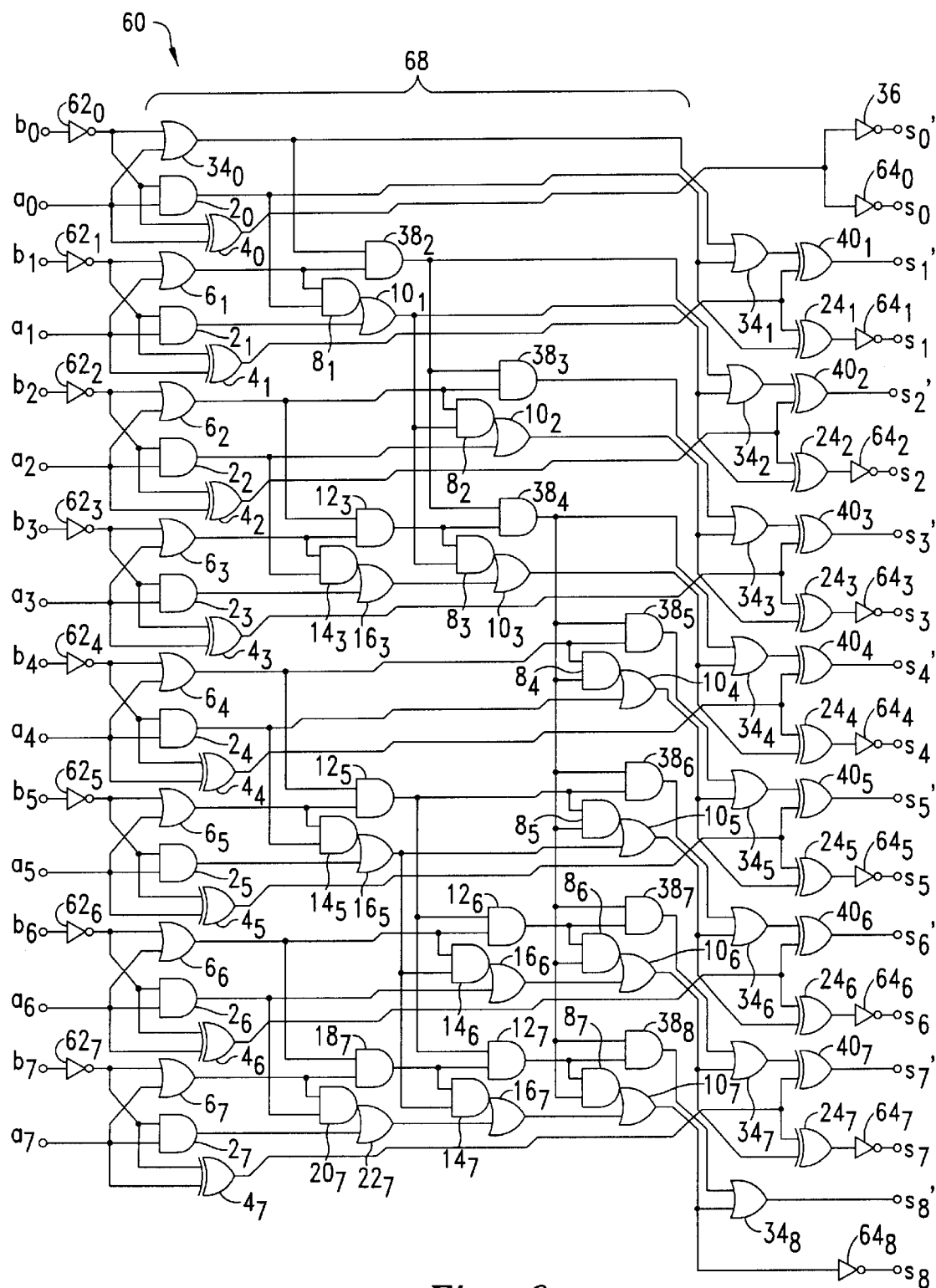
FIG. 6 illustrates addition circuitry according to a third embodiment for simultaneously producing A−B and B−A.

FIG. 6 illustrates addition circuitry suitable for producing as outputs the value s=B−A and the value s'=A−B. The addition circuitry in FIG. 6 is very similar to that in FIG. 4. It comprises the additional circuitry: inverters $62_i$, where i=0, 1 . . . 7, which invert the bit values $b_i$ and the inverters $64_i$, where i=0, 1, 2 . . . 8, where the inverters $64_i$ where i=0, 1 . . . 7, invert the outputs from the XOR gate $24_i$ to produce the bit values B−A and the inverter $64_8$ inverts the output from the OR gate $10_7$ to produce the carry value $c_8$.

Figure 7:
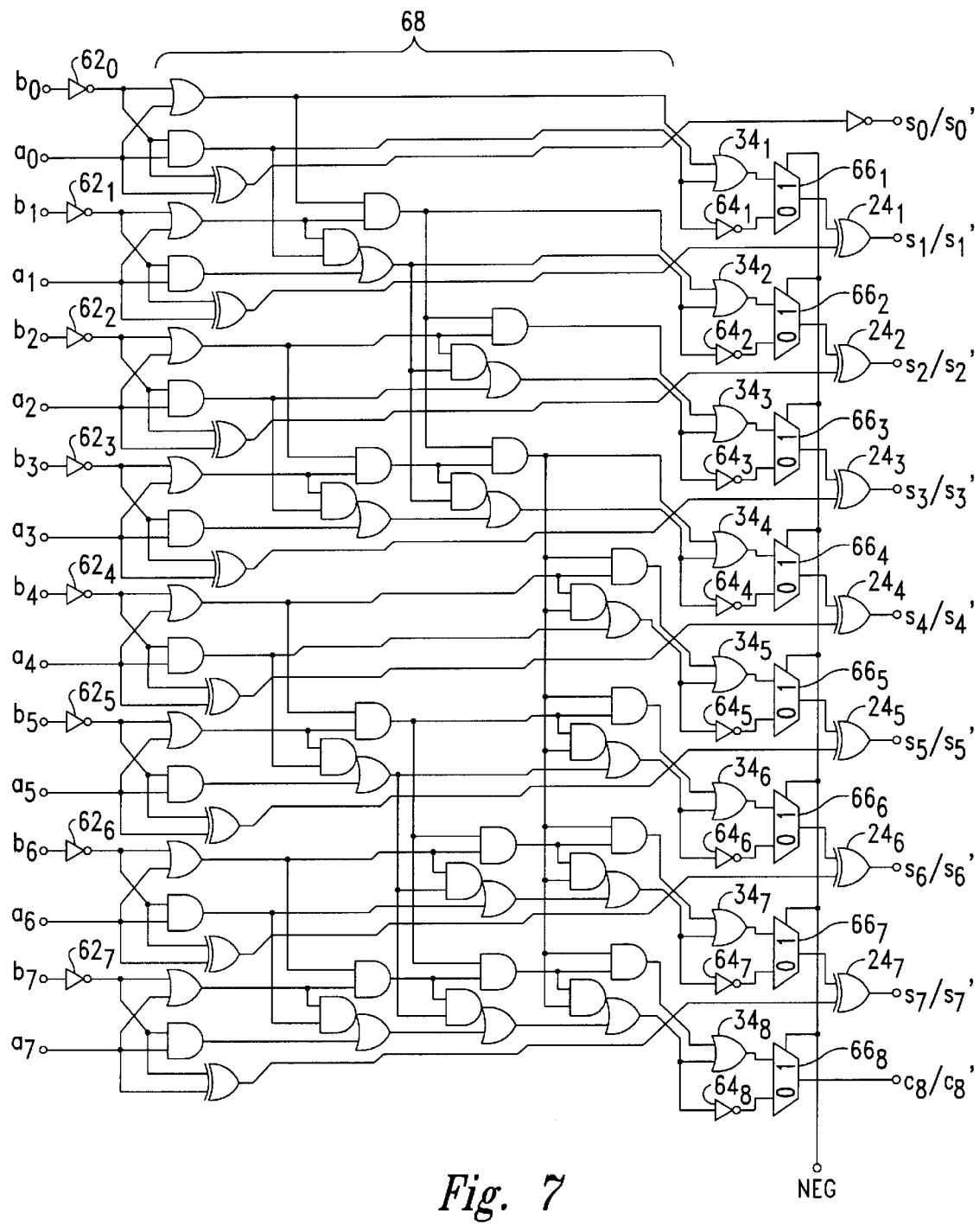
FIG. 7 illustrates addition circuitry according to a fourth embodiment for selectively producing A−B or B−A.

FIG. 7 illustrates addition circuitry suitable for selectively producing the output A−B or the output B−A depending upon-the value of signal NEG. The circuitry in FIG. 7, differs from that in FIG. 5 in that there are no AND gates $52_i$ but there is additional circuitry including: inverters $62_i$, where i=0, 1 . . . 7, which invert the bit values $b_i$; and inverters $64_i$, where i=1, 2 . . . 8, positioned in parallel with the OR gates $34_i$ such that they receive as inputs the outputs from the OR gates $10_i$ and selectively provide their outputs to the same input of the XOR gates $24_i$ as the output of the OR gates $34_i$. The circuitry of FIG. 7 additionally has multiplexors $66_i$, where i=1, 2 . . . 8, which select in dependence upon signal NEG whether the output of the OR gate $34_i$ or the output of the NOT gate (inverter) $64_i$ is supplied as an input to the XOR gate $24_i$. When the signal NEG is one, the output of the OR gates $34_i$ is provided as inputs to the XOR gates $24_i$ that in turn produces the bit value $S_i$, which is a bit of the number A−B. When the signal NEG is zero, the output of the NOT gates $64_i$ are supplied as inputs to the XOR gates $24_i$, which in turn produces bit value $s_i$, which are bits of the number S, namely B−A.

Referring to FIGS. 6 and 7, for the circuits to operate as subtractors, i.e. the values A−B and B−A as outputs, the inputs numbers A and B must be in twos complement format. When a number is in twos complement format it may be negated by either inverting all the bits of the number and then adding one or by subtracting one to produce a new number and then inverting all the bits of the new number. Consequently, if A and B are represented in twos complement format, the value A−B may be represented as A+NOT(B)+1 which is the output S' in FIG. 6 and the value B−A may be represented as NOT(A+NOT(B)) which is the value S in FIGS. 6 and 7.

Figure 8:
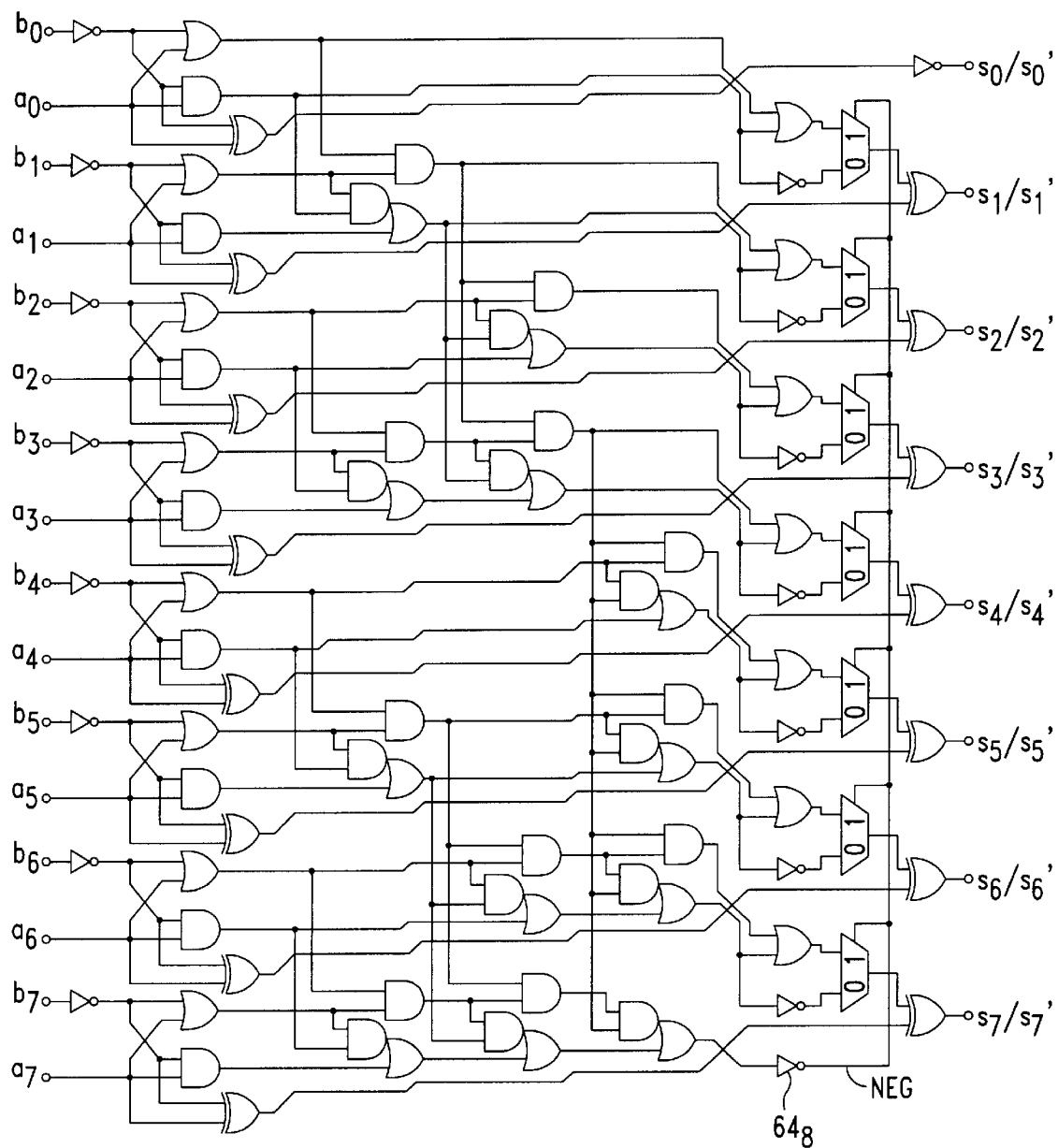
FIG. 8 illustrates addition circuitry for "automatically" selecting the absolute value |A−B|.

FIG. 8 illustrates addition circuitry that is similar to that illustrated in FIG. 7, except that the AND gate $38_8$ and NOR gate $34_8$ associated with the carry signals $c_8/c_8'$ are not present. Also, the final multiplexor $66_8$ is not present. Instead, the output of the inverter $64_8$ in respect of the topmost bit is used to "automatically" select the positive result value *A−B* by using its output as the select signal NEG. In other respects, operation of the circuitry of FIG. 8 is the same as that of FIG. 7.

What is claimed is:

1. Circuitry for adding a first binary number having a plurality of bits to a second binary number having a plurality of bits to produce a third binary number having a plurality of bits and a fourth binary number having a plurality of bits and corresponding to the third binary number plus one, said circuitry comprising a plurality of stages wherein each stage includes:

a first input for receiving a bit of the first binary number;

a second input for receiving a bit of the second binary number having the same binary weight as the bit received at the first input;

first output means for producing a bit of the third binary number and comprising exclusive OR means for combining a first signal and a second signal to produce a bit of the third binary number; and second output means for producing a bit of the fourth binary number comprising exclusive OR means for combining the first signal and a third signal to produce a bit of the fourth binary number, wherein said first and second output means produce the third and fourth binary numbers substantially simultaneously.

2. The circuitry of claim 1, wherein said first signal for a stage having a binary weight i corresponds to the bit propagation signal $p_i$ for that stage.

3. The circuitry of claim 1, wherein said second signal for a stage having a binary weight i corresponds to the group carry value.

4. The circuitry of claim 2, wherein said first signal for a stage corresponds to the output of an exclusive OR gate supplied with the bit of the first binary number and the bit of the second binary number received at the first and second inputs of the stage.

5. The circuitry of claim 1, wherein at least one of said first and second output means of each stage comprises an XOR gate and an OR gate.

6. The circuitry of claim 5, wherein the third signal is created by providing the second signal and a group kill signal to the OR gate of the second output means.

7. A rounding circuit comprising circuitry as claimed in claim 1.

8. A floating point arithmetic unit comprising circuitry as claimed in claim 1.

9. A floating point subtraction unit comprising circuitry as claimed in claim 1.

10. An absolute difference circuitry comprising circuitry as claimed in claim 1.

11. A video encoding system comprising circuitry as claimed in claim 1.

12. Circuitry for adding a first binary number having a plurality of bits to a second binary number having a plurality of bits to produce a third binary number having a plurality of bits or a fourth binary number having a plurality of bits and corresponding to the third binary number plus one, said circuitry comprising a plurality of stages wherein each stage includes:

a first input for receiving a bit of the first binary number;

a second input for receiving a bit of the second binary number having the same binary weight as the bit received at the first input; and output means for producing a bit of the third binary number or a bit of the fourth binary number, wherein said output means comprises exclusive OR means for combining a first signal and a second signal to produce a bit of the third binary number or the first signal and a third signal to produce a bit of the fourth binary number, said exclusive OR means operating in dependence on the value of a single independent control signal being supplied directly to an output stage.

13. The circuitry of claim 12, wherein said first signal for a stage having a binary weight i corresponds to the bit propagation signal $p_i$ for that stage.

14. The circuitry of claim 12, wherein said second signal for a stage having a binary weight i corresponds to the group carry value.

15. The circuitry of claim 13, wherein said first signal for a stage corresponds to the output of an exclusive OR gate supplied with the bit of the first binary number and the bit of the second binary number received at the first and second inputs of the stage.

16. The circuitry of claim 12, wherein the output means of each stage comprises an XOR gate and an OR gate.

17. The circuitry of claim 16, wherein the third signal is created by providing the second signal and a group kill signal to the OR gate.

18. The circuitry of claim 17, wherein the group kill signal is supplied to a first input of said OR gate in dependence upon said control signal.

19. A rounding circuit comprising circuitry as claimed in claim 12.

20. A floating point arithmetic unit comprising circuitry as claimed in claim 12.

21. A floating point subtraction unit comprising circuitry as claimed in claim 12.

22. An absolute difference circuitry comprising circuitry as claimed in claim 12.

23. A video encoding system comprising circuitry as claimed in claim 12.

24. Circuitry for performing subtraction operations on a first binary number having a plurality of bits and a second binary number having a plurality of bits to produce a third binary number having a plurality of bits or a fourth binary number having a plurality of bits, said circuitry comprising a plurality of stages wherein each stage includes:

a first input for receiving a bit of the first binary number;

a second input for receiving a bit of the second binary number having the same binary weight as the bit received at the first input and having been inverted; and output means for producing a bit of the third binary number or a bit of the fourth binary number, wherein said output means comprises exclusive OR means for combining a first signal and a second signal to produce a bit of the third binary number or the first signal and a third signal to produce a bit of the fourth binary number, said exclusive OR means being supplied by logic circuitry comprising an OR gate and an inverter which are supplied in parallel with said second signal, said logic circuitry being operable to produce said second or third signal in dependence upon a control signal.

25. The circuitry of claim 24, wherein said fourth binary number corresponds to the first binary number minus the second binary number.

26. The circuitry of claim 24, wherein said third binary number corresponds to the second binary number minus the first binary number.

27. The circuitry of claim 24, wherein said first signal for a stage having a binary weight i corresponds to the bit propagation signal $p_i$ for that stage.

28. The circuitry of claim 24, wherein said second signal for a stage having a binary weight i corresponds to the group carry value.

29. The circuitry of claim 27, wherein said first signal for a stage corresponds to the output of an exclusive OR gate supplied with the bit of the first binary number and the bit of the second binary number received at the first and second inputs of the stage.

30. The circuitry of claim 24, wherein the output means of each stage comprises an XOR gate and an OR gate.

31. The circuitry of claim 30, wherein the third signal is created by providing the second signal and a group kill signal to the OR gate.

32. The circuitry of claim 24, further comprising multiplexor selection means for selecting said third binary number or said fourth binary number as an output signal of the circuitry based on said control signal.

33. A floating point arithmetic unit comprising circuitry as claimed in claim 24.

34. A floating point subtraction unit comprising circuitry as claimed in claim 24.

35. An absolute difference circuitry comprising circuitry as claimed in claim 24.

36. A video encoding system comprising circuitry as claimed in claim 24.

37. Circuitry for providing the positive difference between a first binary number having a plurality of bits and a second binary number having a plurality of bits to produce a third binary number having a plurality of bits or a fourth binary number having a plurality of bits, said circuitry comprising a plurality of stages wherein each stage includes:

a first input for receiving a bit of the first binary number;

a second input for receiving a bit of the second binary number having the same binary weight as the bit received at the first input and having been inverted; and output means for producing a bit of the third binary number or a bit of the fourth binary number, wherein said output means comprises exclusive OR means for combining a first signal and a second signal to produce a bit of the third binary number or a first signal and a third signal to produce a bit of the fourth binary number, said exclusive OR means being supplied by logic circuitry comprising an OR gate and an inverter which are supplied in parallel with said second signal, said logic circuitry being operable to produce said second or third signal in dependence upon the value of a control signal supplied from carry and propagation circuitry disposed between at least one of said inputs and said output means.

38. The circuitry of claim 37, wherein said fourth binary number corresponds to the first binary number minus the second binary number.

39. The circuitry of claim 37, wherein said third binary number corresponds to the second binary number minus the first binary number.

40. The circuitry of claim 37, wherein said first signal for a stage having a binary weight i corresponds to the bit propagation signal $p_i$ for that stage.

41. The circuitry of claim 40, wherein said first signal for a stage corresponds to the output of an exclusive OR gate supplied with the bit of the first binary number and the bit of the second binary number received at the first and second inputs of the stage.

42. The circuitry of claim 37, wherein said second signal for a stage having a binary weight i corresponds to the group carry value.

43. The circuitry of claim 37, wherein the output means of each stage comprises an XOR gate and an OR gate.

44. The circuitry of claim 43, wherein the third signal is created by providing the second signal and a group kill signal to the OR gate.

45. The circuitry of claim 37, further comprising multiplexor selection means for selecting said third binary number or said fourth binary number as an output signal of the circuitry based on said signal from said carry and propagation circuitry disposed between said input means and said output means.

46. A floating point arithmetic unit comprising circuitry as claimed in claim 37.

47. A floating point subtraction unit comprising circuitry as claimed in claim 37.

48. An absolute difference circuitry comprising circuitry as claimed in claim 37.

49. A video encoding system comprising circuitry as claimed in claim 37.

* * * * *